US012688449B2

(12) United States Patent
Pakkiam et al.

(10) Patent No.: US 12,688,449 B2
(45) Date of Patent: Jul. 21, 2026

(54) ADVANCED QUANTUM PROCESSOR ARCHITECTURE

(71) Applicant: Silicon Quantum Computing Pty Limited, Kensington (AU)

(72) Inventors: Prasanna Pakkiam, Kensington (AU); Michelle Yvonne Simmons, Kensington (AU)

(73) Assignee: Silicon Quantum Computing Pty Limited, Kensington (AU)

( * ) Notice: Subject to any disclaimer, the term of this patent is extended or adjusted under 35 U.S.C. 154(b) by 783 days.

(21) Appl. No.: 18/000,658

(22) PCT Filed: Jun. 4, 2021

(86) PCT No.: PCT/AU2021/050559
§ 371 (c)(1),
(2) Date: Dec. 2, 2022

(87) PCT Pub. No.: WO2021/243419
PCT Pub. Date: Dec. 9, 2021

(65) Prior Publication Data
US 2023/0229952 A1 Jul. 20, 2023

(30) Foreign Application Priority Data
Jun. 4, 2020 (AU) ................................. 2020901842

(51) Int. Cl.
*G06N 10/40* (2022.01)
(52) U.S. Cl.
CPC ..................................... *G06N 10/40* (2022.01)

(58) Field of Classification Search
CPC ....................................................... G06N 10/40
(Continued)

(56) References Cited

U.S. PATENT DOCUMENTS 9,773,208 B2 9/2017 Betz
11,322,591 B2 * 5/2022 Singh .................... B82Y 40/00
(Continued)

FOREIGN PATENT DOCUMENTS

WO WO2020037373 A1 2/2020

OTHER PUBLICATIONS

Ansaloni, et. al., "Single-Electron Control in a Foundry-Fabricated Two-Dimensional Qubit Array", arXiv Preprint, 2020, 9 pgs.
(Continued)

*Primary Examiner* — Suchin Parihar
(74) *Attorney, Agent, or Firm* — Lee & Hayes, P.C.

(57) ABSTRACT
One-dimensional and two-dimensional arrays of qubits are disclosed. The one-dimensional array includes two or more double-quantum dots embedded in silicon, the two or more double-quantum dots arranged in an Echelon formation, such that the distance between the two or more double-quantum dots is approximately 40 nm and the distance between the two quantum dots in each double-quantum dot is approximately 12 nm; two or more reservoirs to load electrons to the corresponding two or more double-quantum dots to form singlet-triplet qubits in each double-quantum dot; and two or more gates for controlling the formed singlet-triplet qubits. The two-dimensional array of qubits includes two or more layers of vertically-stacked one-dimensional arrays of qubits.

20 Claims, 8 Drawing Sheets

(58) Field of Classification Search
USPC ........................................................ 716/100
See application file for complete search history.

(56) References Cited

U.S. PATENT DOCUMENTS

| | | | | |
|---|---|---|---|---|
| 2002/0179879 A1* | 12/2002 | Lin | ........................ | A63H 33/28 |
| | | | | 252/1 |
| 2002/0179897 A1* | 12/2002 | Eriksson | ............ | H10D 48/3835 |
| | | | | 257/14 |
| 2008/0031296 A1* | 2/2008 | Spillane | ................ | B82Y 10/00 |
| | | | | 385/24 |
| 2019/0147359 A1* | 5/2019 | Chen | ...................... | G06N 10/40 |
| | | | | 257/31 |
| 2019/0393398 A1* | 12/2019 | Leipold | .................. | G06N 99/00 |
| 2020/0135864 A1* | 4/2020 | Singh | ..................... | G06N 10/20 |

OTHER PUBLICATIONS

House, et al., "Radio Frequency Measurements of Tunnel Couplings and Singlet-Triplet Spin States", Nature Communications, vol. 3, No. 1, 2015, pp. 1-6.

PCT Search Report for Application No. PCT/AU2021/050559, mailed Dec. 9, 2021, 6 pgs.

Pakkiam, et al., "Characterization of a Scalable Donor-Based Singlet-Triplet Qubit Architecture in Silicon", Nano Letters, vol. 18, No. 7, 2018, pp. 4081-4085.

Vandersypen, et al., "Interfacing Spin Qubits in Quantum Dots and Donors—Hot, Dense, and Coherent", npj Quantum Information, vol. 3, No. 1, 2017, 10 pgs.

Writen Opinion for Application No. PCT/AU2021/050559, mailed Jun. 30, 2021, 6 pgs.

* cited by examiner

ADVANCED QUANTUM PROCESSOR ARCHITECTURE

This Application is the US National Phase Application of PCT/AU2021/050559 filed on 4 Jun. 2021, which claims priority to AU application No. 2020901842 filed on 4 Jun. 2020, which is incorporated herein by reference.

TECHNICAL FIELD

Aspects of the present disclosure are related to processing elements for an advanced processing system, and particularly, but not exclusively, to an advanced quantum processor architecture.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

In a semiconductor quantum dot, electrons are confined in a "box" small enough that they stop behaving like electrons in the bulk of a solid, and start behaving like electrons in individual atoms. In particular, the electrons occupy discrete energy levels, which, if the temperature is small compared to the energy level-spacing, allows the electrons to be forced into the ground state of the dot. The spin of an electron stored in a quantum dot couples weakly to its environment, making it a promising candidate for a quantum bit ("qubit")—a device for storing and manipulating information in quantum computers.

One such type of qubit is called a singlet-triplet qubit. In singlet-triplet qubits, two quantum dots, each with one or more electrons, are formed side-by-side and tuned so that they are tunnel coupled. Information can be stored in the relative spin of the electrons, further reducing coupling of the qubit to its environment. Of the four possible relative spin states of the electrons (S, $T_0$, T+, and T–), information is generally stored in the S and $T_0$ states (the so-called 'logical subspace'). This choice is generally motivated by two advantages. First, these two qubit states remain unaffected by changes in magnetic field (they are both m=0), which further decouples them from the environment. Second, due to the Pauli Exclusion principle, while in the singlet state one electron has an orbital wavefunction hybridized between the two dots, in the triplet states both electrons are confined to separate dots. Therefore, by tuning the relative chemical potentials of the two dots, the charge distribution of electrons can be tuned.

However, known architectures for implementing singlet-triplet quantum dots to create large-scale many-qubit quantum processors have issues. For example, some geometric architectures have flaws when attempting to interconnect qubits across a 2D array. For example, additional space is required for sensing devices and control lines to control the qubits. Accordingly, an improved architecture for implementing singlet-triplet quantum dots to create large-scale many-qubit quantum processors is desirable.

SUMMARY

According to a first aspect of the present invention, there is provided a one-dimensional array of qubits comprising: two or more double-quantum dots embedded in silicon, the two or more double-quantum dots arranged in two parallel arrays which are offset with respect to each other (Echelon formation), such that the distance between the two or more double-quantum dots is approximately 40 nm±4 nm and the distance between the two quantum dots in each double-quantum dot is approximately 12 nm±2 nm; two or more reservoirs to load electrons to the corresponding two or more double-quantum dots to form singlet-triplet qubits in each double-quantum dot; and two or more gates for controlling the formed singlet-triplet qubits.

In some embodiments, the double quantum dots are formed using phosphorus donor atoms patterned into the silicon substrate.

Further, in some embodiments, the inter qubit coupling is approximately 39 GHz±4 GHz.

In some preferable embodiments, an inter-dot tunnel coupling value between the two quantum dots in each double-quantum dot is approximately 6.5 GHz±1 GHz.

Further, the distance between the double-quantum dots and the two or more gates is approximately 45 nm±5 nm and the distance between the double-quantum dots and the two or more reservoirs is approximately 17 nm±1 nm.

Preferably, each double quantum dot includes a 1P donor and a 2P donor in an asymmetric configuration and the two or more double-quantum dots are arranged parallel to an adjacent pair of qubits. Further, the 1P donor in each double quantum dot is positioned closer to the corresponding reservoir and the 2P donor in each double quantum dot is positioned away from the corresponding reservoir in some embodiments.

The angle between the two dots in each double-quantum dot is approximately 32±3 degrees in some embodiments.

In another aspect of the present invention, there is provided a two-dimensional quantum information processor. The two-dimensional quantum information processor comprises two or more layers of vertically stacked one-dimensional arrays of qubits as described in the first aspect.

In some embodiments, adjacent layers of the two or more layers of vertically-stacked one-dimensional arrays are at a distance of approximately 35 nm±3 nm from each other. Further, the adjacent layers of the two or more layers may be horizontally offset from each other by approximately 5 nm±3 nm.

In yet other embodiments, positions of the two or more reservoirs and the two or more gates are swapped on alternating layers.

Figure 1:
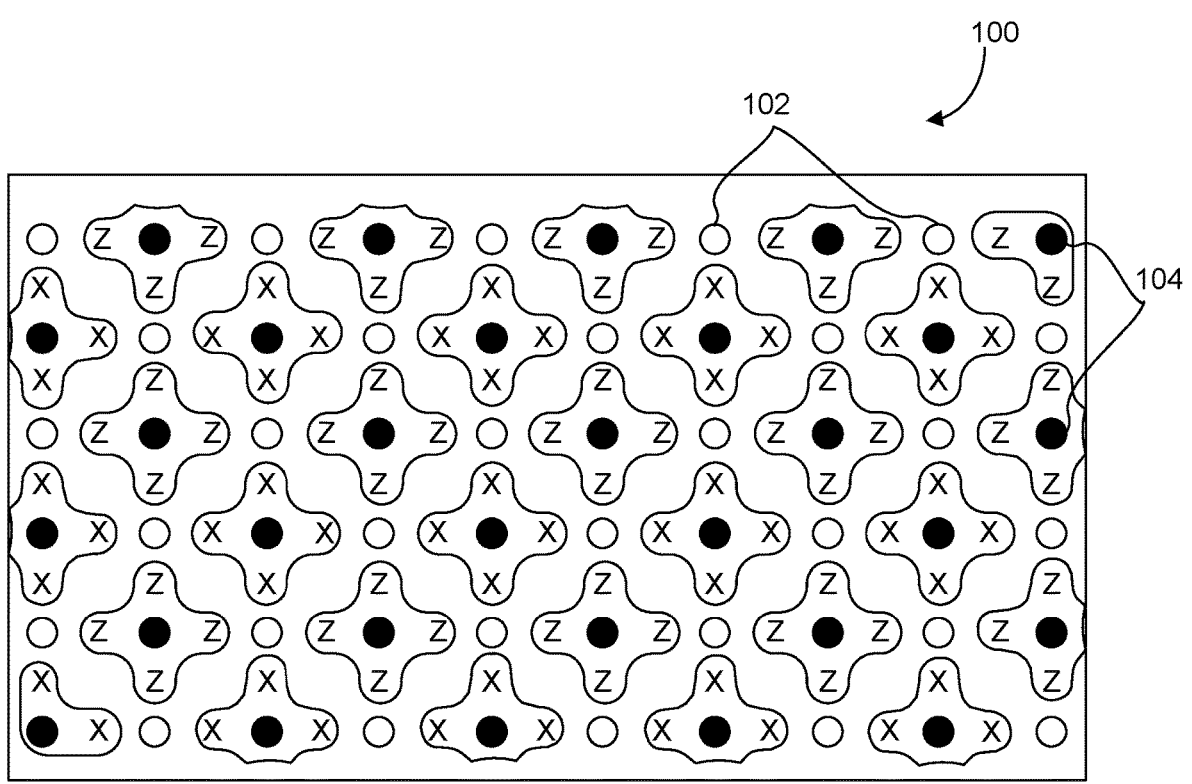
FIG. 1 illustrates a conventional arrangement of a qubit architecture suitable for performing a 2D surface code.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Generally speaking, quantum computers provide a means to solve certain computing problems that cannot be solved in a reasonable period of time using conventional, classical computers. These problems include factoring very large numbers into their primes, which on a quantum computer can be accomplished relatively quickly using Shor's algorithm, and searching large, unstructured data sets, which can be done on a quantum computer using Grover's search algorithm. These algorithms are well-understood in terms of operations that need to be performed over a few qubits.

Although a number of different types of qubits have been successfully made using different technologies, these qubits have not performed sufficiently well to serve directly as computational qubits. This is because qubits are oftentimes imperfect and can include control errors (yielding imperfect qubit rotations), bit-flip errors (i.e., changing states due to relaxation mechanisms) and phase errors (that cause random fluctuations in precession frequency). Typically, control errors that arise in qubits due to imperfect control pulses can be reduced using pulse compensation. Bit-flip errors and phase errors can be reduced by using qubits with longer lifetimes.

Within the realm of solid-state spin qubits, P-donor qubits have demonstrated extremely long lifetimes. Electrons hosted on P-donor dots have been shown to have lifetimes (specifically the spin-up to spin-down relaxation time of single electron spins) of up to 30 s. Theoretical predictions suggest that by correctly orienting a global magnetic field (applied to separate the energy levels of the electron spins) with respect to an electric field (applied to add electrons to the quantum dots and/or control the electron spins to perform operations) in the device, spin-orbit coupling can be minimised giving rise to spin lifetimes as long as 18 minutes.

Although longer spin lifetimes are desirable, these are irrelevant if the decoherence times are much shorter than the spin lifetimes, causing phase errors to dominate the overall error rate. To increase decoherence times, typically a $^{28}$Si substrate is utilized, which increases the single electron spin decoherence times from 55 ns to 270 μs.

These qubit errors can further be reduced by using singlet-triplet qubits, which do not require a micro-magnet or a high frequency RF antenna for control and are generally immune to global magnetic field noise when compared to their single electron spin qubit counterparts.

However, even with these mitigation strategies, the immaturity of the field means that solid-state semiconductor qubits have yet to demonstrate sufficiently low error rates (both for single qubit and two qubit gates) to perform useful algorithms. Thus, information redundancy is often utilized. That is, multiple qubits are utilized to represent the information of a single 'logical qubit'. In one example, a logical qubit architecture utilizes a 2D array of qubits. Here, a given qubit's state can be protected by redundant ancillary qubits on all four sides of a qubit, which helps overcome the individual qubit error rates. One logical qubit in this architecture is therefore formed of a data qubit surrounded by 4 ancillary qubits. The logical qubits can then be moved around in braiding operations to perform two-qubit gates.

FIG. 1 illustrates a conventional arrangement of a qubit architecture 100 suitable for performing a 2D surface code. The qubits can be formed using any known technology to form such qubits. In this figure, qubits are formed on the surface of material (e.g., a $^{28}$Si substrate). The white dots represent physical data qubits 102, while the black dots represent physical measurement or ancillary qubits 104. The ancillary qubits 104 are interleaved with the data qubits 102 such that each ancillary qubit 104 has four surrounding data qubits 102 and vice versa. This type of surface code typically includes a network of X and Z stabilizers (where a stabilizer constitutes a parity measurement along the Pauli-x and Pauli-z axes between two qubits). In simple terms, to protect a qubit state, two degrees of freedom need to be protected. Thus, redundant ancillary qubits 104 are used to test for qubit errors along the X and Z axes. To enhance redundancy, a given qubit can be stabilised with many Z-stabilisers along one axis and many X-stabilisers along an orthogonal axis. Then the new qubits placed to stabilise the initial qubit can also be individually stabilised upon which a 2D grid is obtained. Typically, the surface code continually stabilises its qubits via repeated stabilizer measurements.

A number of architectures to create such surface codes have been proposed. However, most of these proposals suffer from some limitations. For example, in one architecture, GaAs singlet-triplet qubits are utilized which are coupled over long distances via metallic floating gates. This architecture suffers from charge noise because of the metallic floating gates.

Figure 2:
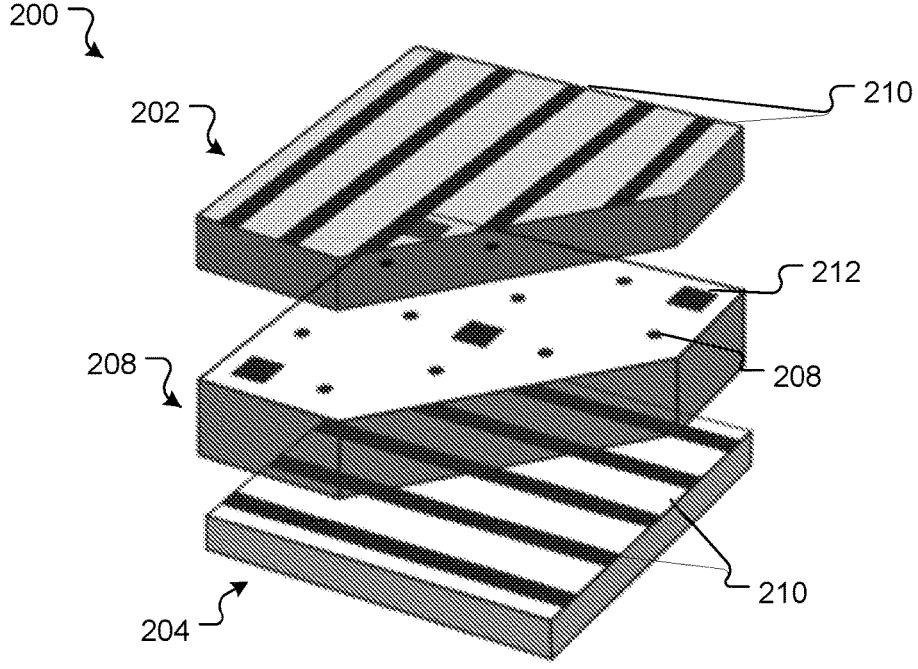
FIG. 2 illustrates an example architecture having multi-layer STM-patterned Si—P single-spin qubits suitable for performing a 2D surface code.

In another proposal, single-spin qubits formed in a silicon substrate are used. FIG. 2 illustrates an example device architecture 200 having multi-layer STM-patterned Si—P single-spin qubits suitable for performing a two-dimensional surface code. In this example, qubits are encoded in donor sites, which comprises a plurality of donor atoms arranged in a grid. Data qubit elements are encoded in a first set of the plurality of donor atoms and the remaining donor atoms are arranged to facilitate quantum error correction. The qubits encoded on the second set of donor atoms are ancilla qubits.

Data and ancilla qubits are encoded in the nuclear spin of respective donor atoms. The donor electron and nuclear spins can be rotated simultaneously using a global magnetic field which can be externally applied to the entire architecture. A control structure is arranged in the silicon to interact with the data qubits and the ancilla qubits. The arrangement of the control structure allows controlling a plurality of qubits simultaneously. The qubits can be controlled simultaneously in patterns distributed across the matrix. The structure can be controlled to load or unload an electron to or from each of the donor atoms and simultaneously on multiple donor atoms.

This device 200 includes three vertically separated layers—a lower control layer 202, an upper control layer 204 and a qubit layer 206. The qubit layer includes a grid of P-donors 208 separated by approximately 30 nm±3 nm to form the physical qubits for the surface code. Control lines 210 are disposed in the upper and lower control layers 202, 204. The control lines 210 are arranged perpendicularly, with respect to each other, in a crisscross configuration.

Although the control lines 210 in the two layers do not physically intersect, they define intersection points where they pass across two vertically aligned portions of the lattice. About some of these intersections, control elements, provided in the form of a heavily doped silicon island 212, are formed. Each island forms a single electron transistor (SET) with respective control members disposed above and below the island. A pair of these control members acts as source and drain, and another pair acts as a gate. The SETs 212 enable spin readout.

In the system described with reference to FIG. 2, each SET 212 is configured to interact with four donor atoms 208 to form a unitary cell of the architecture. SETs 212 can be controlled, by applying electrical signals to control lines 210, to load or unload electrons on each donor atom 208 in the architecture or control the spin orientation of an electron or nucleus of one or more donor atoms. Furthermore, the configuration of the donor atoms 208 and the control lines 210 allows for loading or unloading of electrons on multiple donor atoms 208 arranged in predetermined patterns simultaneously. For example, electrons could be loaded onto a plurality of donor atoms disposed on a quadrangular pattern. By selectively loading electrons on specific donor atoms, quantum gate operations can be selectively and simultaneously performed across this architecture. For instance, single-qubit operations are performed via global ESR/NMR pulses, while two-qubit gates are mediated via the magnetic dipole interaction between two electron spins.

Although this architecture results in smaller wire density per qubit and favourable routing topologies, it also suffers from some limitations. For instance, the ability to globally address all the spins via a single ESR/NMR antenna requires uniform field homogeneity (across the full 2D array of qubits), which can be difficult. Secondly, in this architecture if the wavefunction on any specific donor is perturbed too much, it might not be addressed resonantly via a single global ESR/NMR frequency.

Accordingly, a new quantum processor architecture is desirable.

Aspects of the present disclosure utilize a novel one-dimensional (1D) and two-dimensional (2D) architecture using two-electron singlet-triplet qubits. As described previously, two-electron singlet-triplet spin qubits offer the advantage of all-electrical control (that is, no need for a micro-magnet or a high-frequency RF antenna). Further, these qubits exhibit immunity to global magnetic field noise when compared to their single-spin qubit counterparts.

In certain embodiments, double quantum dots using donor atoms are disposed on a silicon substrate. In particular, the two quantum dots, each with one or more donors, are constructed side-by-side and tuned so that they are tunnel coupled. Singlet-triplet qubits can then be encoded in the double quantum dot sites. In some embodiments, the double quantum dots are formed using scanning tunnelling microscopy (STM) techniques with near atomic precision. When implemented in this manner, the smaller scale of the encoded singlet-triplet qubits enables large inter-qubit couplings in the order of 5 GHz-50 GHz; a regime not considered in previous quantum processor architectures.

This larger coupling opens a pathway to realise faster two-qubit gates in a fault-tolerant quantum computing architecture, which are performed via an electric-dipole coupling (also termed 'capacitive coupling') between adjacent qubits. For instance, the large inter-qubit coupling regime enables a controlled Z (CZ) gate (which performs a Pauli-z rotation on a target qubit conditional on the state of a control qubit) to be performed where the control qubit initiates the gate on adjacent target qubit(s) by moving into the (0,2) charge state to cause a shift in the target qubit's detuning if the control qubit is in the singlet state. The resulting state-dependent shift in the target qubit's detuning leads to a faster z-precession frequency to realise a CZ gate. The relevant parameters include the target qubit's default detuning, the control qubit's detuning on initiating the gate, the inter-qubit coupling (shift in target qubit detuning when the control qubit fully enters the (0,2) charge state from the (1,1) charge state) and the charge noise amplitude.

The inventors of the present invention found that an inter-qubit coupling of approximately 39 GHz±3 GHz for an approximate 6.5 GHz inter-dot tunnel coupling resulted in a quantum processor architecture that was the most resistant to charge noise. Especially when implementing a CZ gate, while ensuring that the CZ gate can be deactivated and that the pulse times for controlling the qubits were feasible.

Further still, by realising the larger inter-qubit coupling, an optimum compact 2-gates-per-qubit architecture is attained via conventional electrostatic modelling of the P-donor device without the need for a magnetic drive.

In some embodiments, the quantum dots in the singlet-triplet qubits are designed to have 1P and 2P donors to ensure sufficient electrostatic accessibility in which to prevent gate-to-gate leakage currents. Further, asymmetric 1P-2P dots enable simultaneous access to even parity inter-dot transitions on adjacent qubits, with minimal voltages applied to the gates.

In addition, in specific circumstances, a 1P-2P structure can give a more stable/deterministic magnetic field gradient (i.e., the 2P nuclei pair up to give zero hyperfine interaction while the 1P donor gives ~±29 MHz). In some cases, a B-field gradient may be achieved regardless of the orientation of the 2P Phosphorus nuclei.

Figure 3:
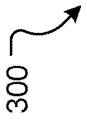
FIG. 3 illustrates a 1D array of singlet-triplet qubits according to some aspects of the present disclosure.

FIG. 3 illustrates an example architecture for a 1D array of qubits 300. As seen in this figure, double-quantum dots 302 are arranged in a parallel Echelon formation. The architecture further includes reservoirs (e.g., source and drain) 304 to load electrons in the double-quantum dots 302 to form singlet-triplet qubits and detuning gates 306 to control the singlet-triplet qubits. In some embodiments, the reservoirs 304 and gates 306 are formed on the same plane/layer as the dots 302. In the example depicted in FIG. 3, 5 double-quantum dots 302 and five corresponding reservoirs 304 and gates 306 are depicted. However, it will be appreciated that a 1D array can be formed of any number of such qubits, reservoirs, and gates.

In certain embodiments, the distance between a detuning gate 306 and a corresponding double-quantum dot 302 (denoted as $d_g$ in FIG. 3) is approximately 45±5 nm whereas the distance between a reservoir 304 and a corresponding double-quantum dot 302 (denoted as $d_r$ in FIG. 3) is approximately 17±1 nm. The distance between adjacent double-quantum dots (denoted as $d_{iq}$ in FIG. 3) may be approximately 40±4 nm.

Further, the double-quantum dots 302 hosting the electrons for the singlet-triplet qubits are arranged vertically to maximize differential lever-arms on the gates 306. The bigger dot in each double-quantum dot is a 2P donor dot (holding both electrons when the qubit enters the S(0,2) charge state) while the smaller dot is a 1P donor. Further, the smaller dots are positioned closer to the reservoirs 304 whereas the bigger dots are positioned further from their corresponding reservoirs 304. In this architecture, the double-quantum dots 302 are slanted at a 32±3 degrees angle with respect to each other as shown in FIG. 3.

Figure 4:
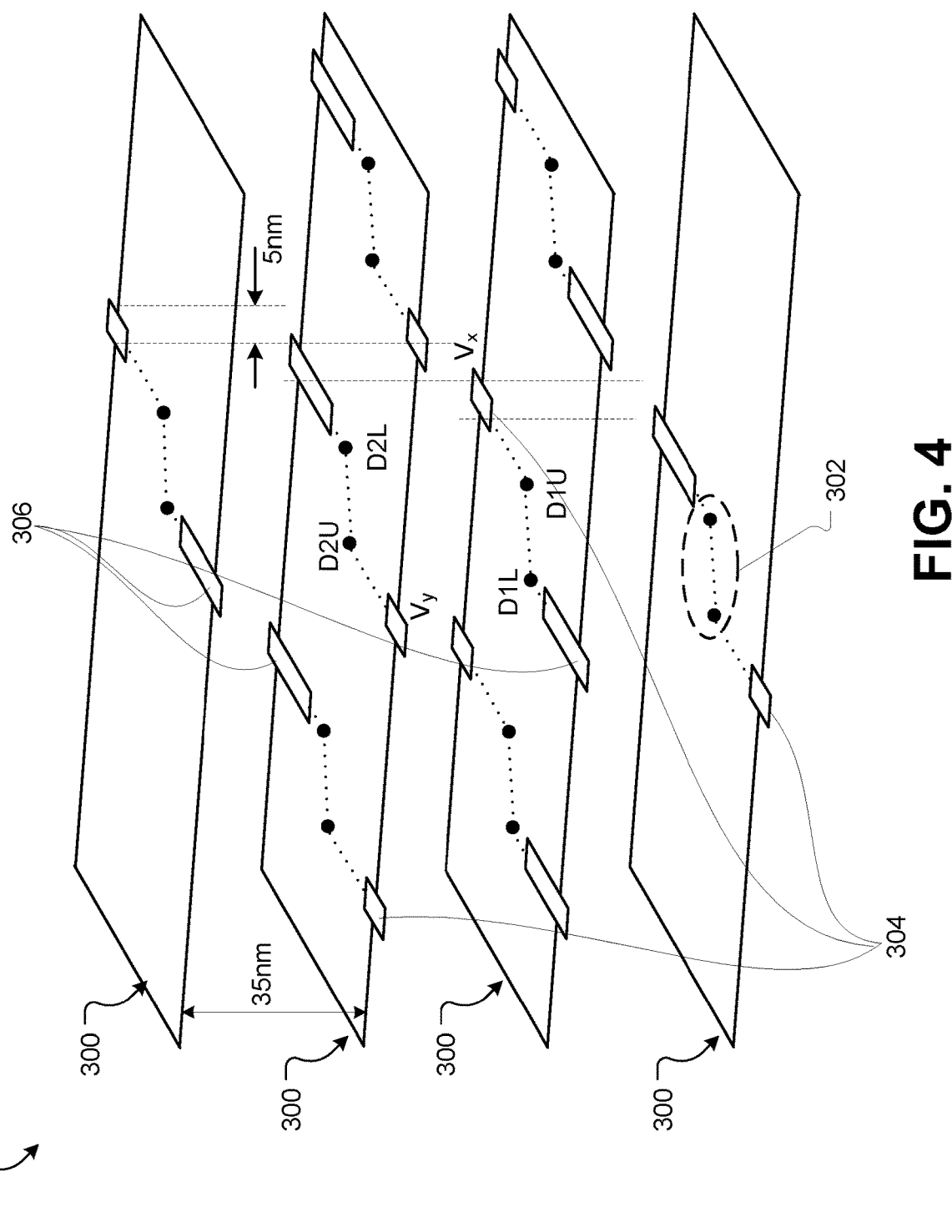
FIG. 4 illustrates a 2D array of singlet-triplet qubits according to some aspects of the present disclosure.

FIG. 4 illustrates an example architecture for a 2D array of qubits 400. This architecture may be an extension of the 1D architecture. However, instead of a conventional 2D array that it created in a single plane, the presently disclosed 2D array is created by stacking multiple 1D arrays 300 vertically one on top of the other.

In one embodiment, this is done using multilayer STM lithography. In particular, lithography may be performed on the multiple vertically separated layers as performed for the 1D array 300. Further, buried P-dopants can be imaged to help align a layer with the layer below via lock-in excitations applied to the STM tip during the imaging process. In the multi-layer configuration, each singlet-triplet qubit formed in a layer interacts not only with the two adjacent qubits formed in that layer, but also interacts with qubits directly above and directly below its layer.

As shown in FIG. 4, the example 2D array 400 includes 4 layers of 1D arrays 300. In one example, the double-quantum dots 302 in each layer may be arranged in a parallel Echelon formation—although other formations are also possible. The architecture further includes reservoirs (e.g., source and drain) 304 to load electrons in the double-quantum dots 302 to form singlet-triplet qubits and detuning gates 306 to control the singlet-triplet qubits. In some embodiments, the reservoirs 304 and gates 306 are formed on the same plane/layer as the dots 302. In the example depicted in FIG. 4.

Further, similar to the 1D arrangement, in certain embodiments, the distance between a detuning gate 306 and a corresponding double-quantum dot 302 may be approximately 45±5 nm whereas the distance between a reservoir 304 and a corresponding double-quantum dot 302 is approximately 17±1 nm. The distance between adjacent double-quantum dots may be approximately 40±4 nm.

Further, in each one-dimensional layer, the double-quantum dots 302 hosting the electrons for the singlet-triplet qubits are arranged vertically to maximize differential lever-arms on the gates 306. The bigger dot in each double-quantum dot is a 2P donor dot (holding both electrons when the qubit enters the S(0,2) charge state) while the smaller dot is a 1P donor. Further, the smaller dots are positioned closer to the reservoirs 304 whereas the bigger dots are positioned further from their corresponding reservoirs 304. In this architecture, the double-quantum dots 302 are slanted at a 32±3 degrees angle with respect to each other as shown in FIG. 4.

Each layer of the two-dimensional arrangement shown in FIG. 4 is separated from the next layer by a distance of about 35 nm±3 nm. Further, the layers are horizontally offset by approximately 5 nm±3 nm from each other. In some embodiments, the positions of the reservoirs 304 and the gates 306 may be swapped on alternating layers by effectively flipping the 1D array 300 from layer to layer to achieve a positive inter-qubit coupling.

In certain embodiments, additional gates or diagnostic TJCS (Tunnel-Junction-Charge-Sensors) structures (not shown) can be patterned on the top and bottom layers and may be utilized for qubit tuning of the inner layers.

Some of the distance values disclosed herein, such as the inter-dot distance (which affects the tunnel coupling) and the reservoir to dot distance (which affects the electron loading time and coupling of the qubit to the reservoir) have been calculated from device simulation iterations and optimisations and must be precise, preferably within ~1 nm precision for the one-dimensional singlet triplet arrangement. The remaining distances and angles are the optimal points or designated optimal values. These values may have slightly larger variations, for example ~2-4 nm in the gate distances and ~5° in the angles.

Further, although ideal distances, angles and coupling values are described above for an optimized single-triplet qubit architecture, singlet-triplet qubit architectures can be fabricated with more relaxed distance, angles and coupling values. For instance, the inter dot angle could be any angle between 0-90 degrees, the inter-qubit coupling could be between 10-50 GHz and the inter-dot tunnel coupling can be between 1-20 GHz. In some examples, the distances between the double dots could be between 30-70 nm, the inter-dot distance could be between 8-15 nm, the dot to reservoir distance may be between 10-25 nm, and the dot to gate distance may be between 30-80 nm. Further, the distance between the two one-dimensional arrays may be between 20-50 nm, and the horizontal offset between the arrays may be between 0-15 nm.

Singlet-Triplet Qubit Operation and Control

Singlet-triplet qubits 302 are defined using the zero-spin projection triplet state ($T_0$) and singlet state (S) of a two-electron system localised in two separated quantum dots. The quantum dots can be donor quantum dots or gate-defined quantum dots. The singlet-triplet qubit 302 can be represented by a Bloch sphere, which is a geometrical representation of the state space of a qubit. The Bloch sphere is a unit 2-sphere, with antipodal points corresponding to a pair of mutually orthogonal state vectors.

Figure 5:
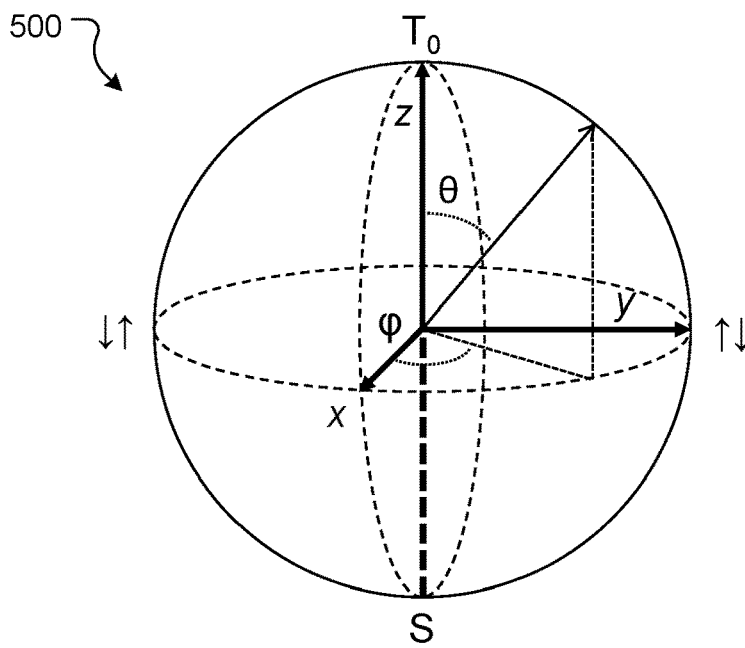
FIG. 5 illustrates a Bloch sphere representation of a singlet triplet qubit.

One such Bloch sphere 500 is shown in FIG. 5. The north and south poles of the Bloch sphere 500 are typically chosen to correspond to standard basis vectors, which in the context of singlet-triplet qubits correspond to the triplet zero state ($T_0$) and the singlet (S) state. Points on the surface of the sphere 500 correspond to states of the system, whereas points in the interior of the sphere 500 correspond to mixed states. The operation of qubits requires rotation of the qubits on the sphere 500 from one point to another arbitrarily. To achieve this goal, two-axis control of a qubit on the Bloch sphere 500 is required. The axes for control are referred to as the x axis and z axis, respectively. The z-axis corresponds to the exchange interaction (J) between the two electrons of the singlet-triplet qubit. This axis (or exchange interaction) is used to control rotations about the $T_0$ and S states. The x-axis corresponds to the difference in the Larmor frequency ($\Delta E_z$) of each electron in the singlet-triplet qubit when the electrons are separated on each quantum dot. This axis (or difference in Larmor frequency) is used to perform rotations between the $T_0$ and S states. Arbitrary rotations (represented by rotation axis $\Omega$) around the Bloch sphere 500 can be performed by controlling the relative strength of J and $\Delta E_z$.

As $\Delta E_z$ is always on in singlet-triplet qubits 302, arbitrary rotations are performed by varying the exchange interaction between the electrons.

Figure 6:
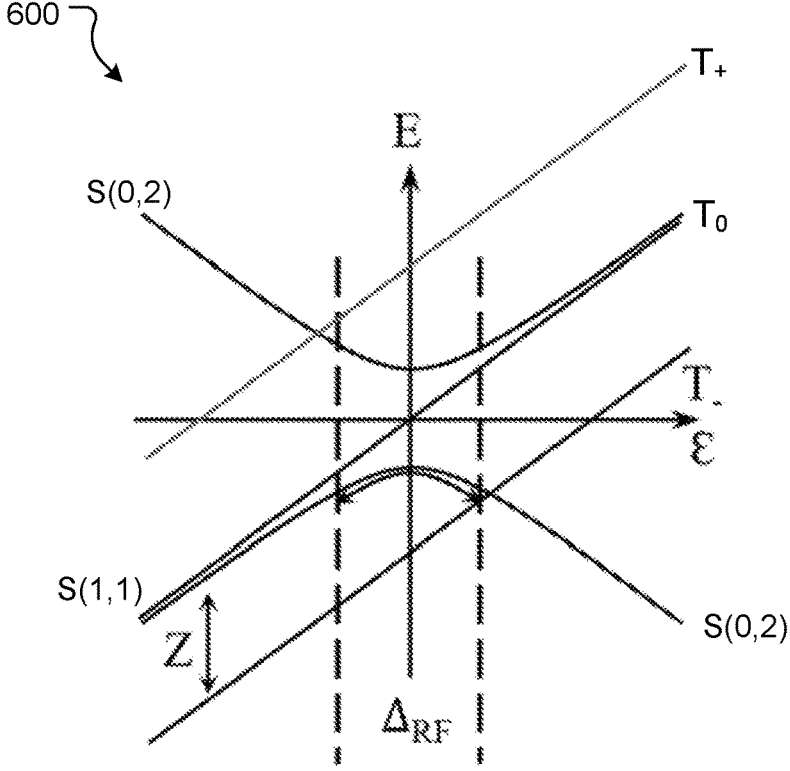
FIG. 6 is an energy level diagram of the singlet triplet qubit near the (1, 1) to (0,2) charge transition anti-crossing.

FIG. 6 is a singlet-triplet qubit energy diagram 600 showing the five energy states including two singlet states S(1,1) and S(0,2) and three triplet states $T_0$, $T_+$ and $T_-$. The triplets states $T_0$, $T_+$ and $T_-$ are split by an external magnetic field having Zeeman energy Z. By applying a radio frequency drive signal $\Delta_{rf}$ a varying detuning is applied to the singlet-triplet qubit 302, whereby an electron can be shuttled between the two quantum dots in the singlet state, but is blocked from shuttling because of Pauli spin blockade in the triplet state.

S(1,1) indicates a situation where there is one electron in each quantum dot of the double quantum dot system and S(0,2) indicates a situation where an electron from the left quantum dot (e.g., left quantum dot of the double quantum dot 302 in FIG. 3) transitions to the right quantum dot (e.g., right quantum dot of the double quantum dot 302 in FIG. 3) such that there are no electrons in the left quantum dot and two electrons in the right quantum dot. In particular, detuning ε is charted along the x-axis and energy E is charted along the y-axis. As seen in FIG. 6, for positive detuning, the ground state is S(0,2). For negative detuning, and at finite magnetic fields, the singlet and triplet ($T_0$) states are nearly degenerate and at zero magnetic field, the triplet states are degenerate.

The qubit states of the singlet-triplet qubit 302 are defined in the S(1,1) charge region of the double quantum dot device. Qubit control in such a system is achieved via control over the detuning between the (0,2) and (1,1) charge states to vary the strength of the exchange interaction. Rotations about the X axis of the qubit 302 are performed by pulsing deep into the (1,1) to turn off J which causes Rabi oscillations at a frequency given by, $\Omega=\sqrt{(J^2+\Delta E_z^2)}$ which for small J is $\Omega \approx \Delta E_z$.

Importantly, $\Delta E_z$ in donor-based devices predominantly comes from the nuclear spin states of the phosphorus donors confining the electrons. Specifically, it means that the hyperfine interaction of each nuclear spin to its own electron controls the speed of the Rabi oscillations.

Generally speaking, the nuclear spins (through hyperfine interaction) define the size of $\Delta E_z$. This has both advantages and issues. For instance, by judiciously selecting the electron and nuclear states $\Delta E_z$ can be engineered to be very large, e.g., 100's of MHz. This allows for very fast qubit rotations and should lead to high-fidelity operation. However, due to the quantised nature of the nuclear spins they can flip during an operation, which leads to decoherence since this would significantly change the value of $\Delta E_z$.

To remedy this issue either dynamic nuclear polarisation (DNP) or nuclear magnetic resonance (NMR) can be used to polarise the nuclear spins into the same state before beginning qubit operation.

Figure 7A:
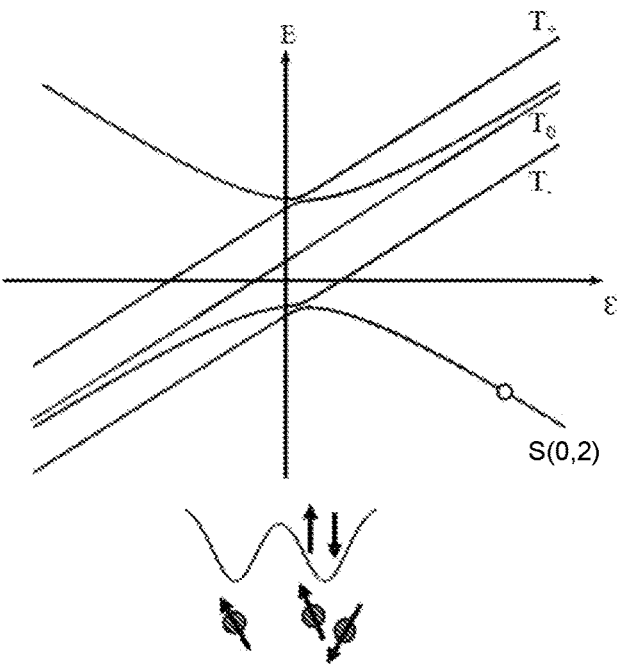
FIGS. 7A-7C illustrate a process for dynamic nuclear polarization of nuclear spins using electrons within the singlet-triplet system.
Figure 7B:
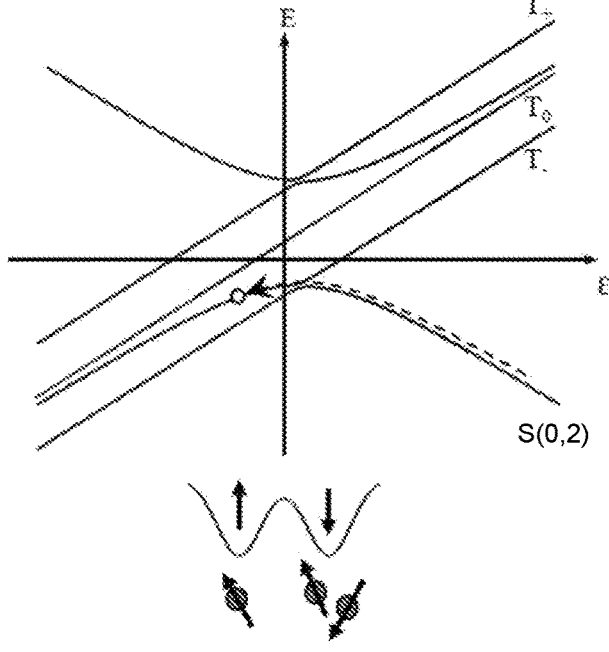
Figure 7C:
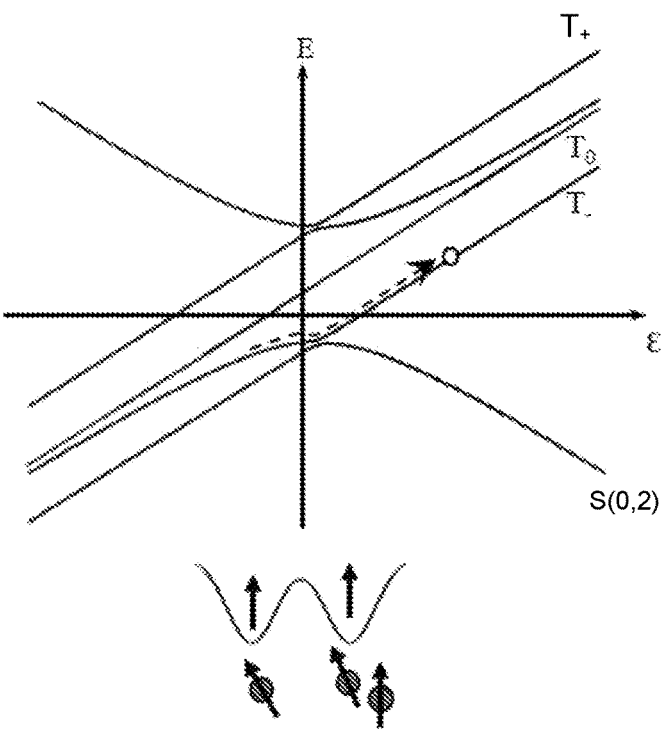

FIG. 7 illustrates a process for dynamic nuclear polarization of nuclear spins using electrons within the singlet-triplet system. Dynamic nuclear polarisation involves initializing the electron spins in the S(0,2) state (see FIG. 7A that shows the initialization step at time t=0). Then a detuning ramp is used to adiabatically move through the singlet-triplet(minus) (see FIG. 7C) anti-crossing as a function of detuning at low magnetic fields to flip the nuclear spins while flopping the electron spin. The detuning is then quickly ramped back to the (0,2) region where it relaxes from the triplet (minus) state to the singlet state (re-initialising the electron spins). This process is repeated multiple times to ensure a large number of nuclear spins are polarised before beginning the qubit operation and measurement.

Nuclear magnetic resonance uses a radiofrequency antenna to resonantly drive the nuclear spins with an oscillating magnetic field. The nuclear spins again would be initialised by NMR prior to operating the qubit and would need to be run in between each measurement.

The varying nuclear spin states also effects the readout method as it maps the singlet and triplet states to different charge sensor signals. These issues can be mitigated by using larger electron numbers or by using smaller donor numbers for each quantum dot.

Based on the fact that a large, stable $\Delta E_z$ is desirable for high-fidelity singlet-triplet qubits an optimal donor and electron configuration for each quantum dot can be predicted. By using a 3rd electron, hyperfine interaction is reduced compared to the 1st electron state by a factor of 10. Therefore, we can reduce the variation of $\Delta E_z$ by reducing the overall hyperfine interaction on both quantum dots. However, this would also reduce the magnitude of $\Delta E_z$ by a factor of 10, which would result in slower qubit operations. Instead, one of the quantum dots can be made a 1P dot using the 1st electron such that there are only two possible nuclear spin states and the other quantum dot can include the 3rd electron on a larger donor cluster (2P, 3P, etc.). In this configuration there is only a single nuclear spin state that needs to be controlled and a large $\Delta E_z$ value of ~±50 MHz can be maintained. This idea can also obviously work for other donor numbers (instead of 1P) but that increases the number of nuclear spins that need to be polarised using DNP or NMR.

Qubit Readout

Readout is an important requirement for fault tolerant quantum computing in semiconductor spin qubits. Spin readout can be performed using single-shot spin readout that relies on a single iteration of quantum computation steps (i.e. qubit initialisation, control and readout). Single-shot readout ensures high reliability and precision for reading out the state of a qubit.

Speed of measurement is an important consideration in quantum processing systems because qubits typically maintain coherence for short periods of time (typically a few hundred microseconds). Single-shot spin readout is typically performed by mapping the spin state of the qubit onto a charge state (i.e. spin-to-charge conversion), which can then be detected using a nearby charge sensor such as a single-electron transistor (SET), quantum point contact (QPC), or tunnel junction. A SET offers good sensitivity, but it is complex, occupies large space and requires at least three electrical contacts to operate: source, drain, and gate which require a significant geometric footprint on the quantum computing chip. Components with the smallest possible footprint are desirable to minimize this for future development of complex and scalable quantum computers comprising hundreds, thousands or millions of qubits.

In some cases, readout of the singlet-triplet array can be performed using radio frequency reflectometry, whereby a change in impedance of the device can be sensed by probing the qubits using a resonant circuit. Such a readout scheme can, for example, be realised using dispersive readout or a single lead quantum dot (SLQD) sensor within the array.

In contrast to SETs, dispersive sensors integrate qubit readout capability into existing control leads or gates (such as gates 306) on the device chip. This eliminates the need for additional proximal charge sensors. Dispersive sensors measure the susceptibility of a single-electron tunnelling at radio frequencies between the two quantum dots, which requires only one terminal to distinguish singlet and triplet spin states on double quantum dots. For example, a change in impedance between quantum states S(1,1) to S(0,2) can be sensed as an added capacitance in the gates 306 as a result of a singlet state (as the singlet state enables an electron to tunnel back and forth between quantum dots under the influence of an oscillating rf drive).

As shown in FIG. 6, by applying a radio frequency drive signal $\Delta_{rf}$, a varying detuning is applied to the singlet-triplet qubit 302, whereby an electron can be shuttled between the two quantum dots in the singlet state, but is blocked from shuttling because of Pauli spin blockade in the triplet state.

Figure 8:
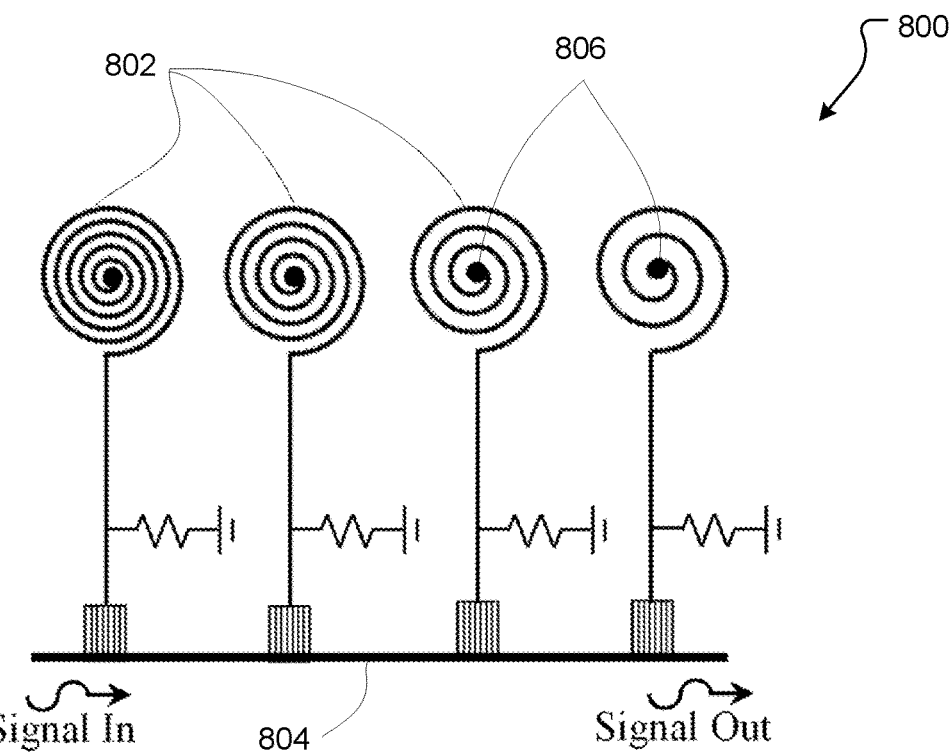
FIG. 8 illustrates an example multiplexed readout chip 800.

Dispersive readout is effective as the readout can be multiplexed using a frequency domain multiplexing chip, enabling fast scalable readout. FIG. 8 illustrates such an example multiplexed readout chip 800. The chip 800 includes a plurality of resonators 802 that are joined via a feedline 804. The resonators 802 may have differing harmonic frequencies. Further, the resonators 802 may be coupled to gates 306 of the quantum device, such as one dimensional qubit array 300 or multi-dimensional array 400 (e.g., via bond pads 806 in the middle of the resonators 802) enabling selective radio frequency probing corresponding to the specific harmonics of the coupled resonator 802. In one example, the multiplexing chip 800 may be formed of niobium titanium nitride.

In this example, one input signal may be provided to feedline 804, which in turn is provided to the multiple resonators that can selectively probe the corresponding qubits 302 based on the specific harmonics of the given resonator 802. Accordingly, readout of multiple qubits can be performed using one input signal that is superimposed with many tones.

Due to the short lifetime of the triplet zero ($T_0$) state, it may be challenging to distinguish between the triplet zero state ($T_0$) and the singlet (S) state (which are the two computational basis states of the singlet triplet qubit) using dispersive readout.

Figure 9:
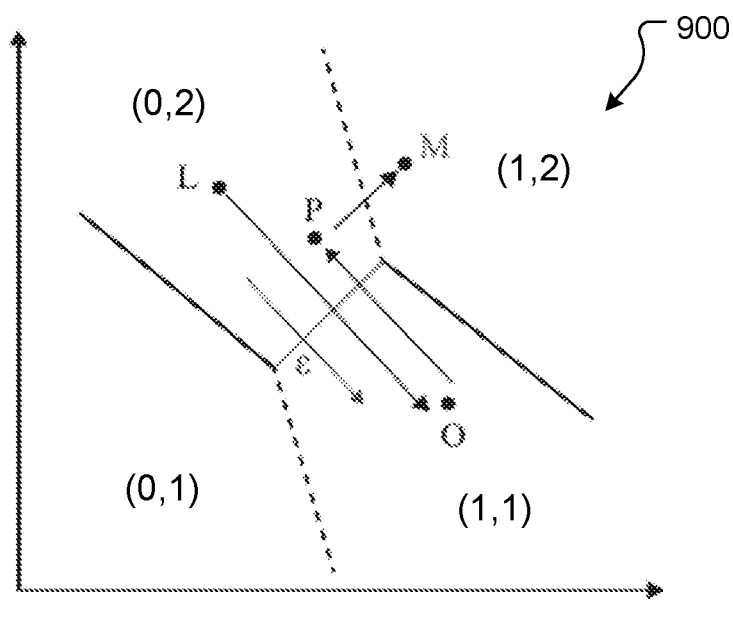
FIG. 9 illustrates an example process for performing a latched readout of a singlet triplet qubit.

An alternate readout strategy is to employ latched readout. A qubit process utilising a latching process can be illustrated in four main steps as shown in FIG. 9, where the numbers in brackets denote the number of electrons in the quantum dot that is closer to the reservoir 304 and the number of electrons in the quantum dot that is away from the reservoir 304, respectively. In the first step, a singlet state can be deterministically loaded by waiting in the (0,2) region where it is the ground state. This is shown as point L in the charge stability diagrams in FIG. 9. Then the system is brought deep into the (1,1) region for qubit operations as represented by point O in FIG. 9. Finally in preparation to perform measurement, the system is brought back towards positive detuning (region (i.e. point P in the (0,2) region).

If the system is in a singlet state, the two electrons can be found on the same dot and hence the system will be in the (0,2) ground state but the triplets will remain in the (1,1) configuration as they are blocked from the ground state due to Pauli blockade. This forms the basis of the standard PSB readout to distinguish the $S_0$ from $T_0$ states. However as mentioned before, the triplet zero $T_0$ state can rapidly decay to the singlet state and this relaxation time T1 can be much shorter than the measurement time. Latched readout adds an additional fourth step to the standard PSB method in order to extend the difference in lifetimes of the measured states. After transitioning through P at a shorter time than the relaxation time T1, the system is brought rapidly to point M by crossing the bottom dot transition line (dashed lines).

The trick of latched readout lies in the fact that in order to reach the ground state at point M, the singlet and triplet states have different pathways to exchange an electron with the reservoir. If the singlet state is in the S(0,2) electron configuration, the system can be brought to point M in the (1,2) region. In this case, an electron needs to be added to the left dot for singlets and to the right dot for triplets. But because the direct tunnelling from the right dot to the reservoir is suppressed, the (1,1) triplet can relax to the (1,2) ground state while the singlet remains in the S(0,2) state. It is this large signal caused by a change in the electron charge configuration that can be easily picked up by a charge sensor.

Two Gate Operations

Two-qubit gates in singlet-triplet qubits utilise electric dipole couplings also termed 'capacitive coupling' between the qubits. Generally speaking, the triplet state always remains in a (1, 1) charge state with respect to detuning, while the singlet state can change between charge states S(1,1) and S(0,2) with respect to detuning. This means that above zero detuning, a singlet (S) state will have most of its electric charge transferred onto a single dot, while for the same detuning, a triplet ($T_0$) state will have both electrons occupying separate dots. The difference in charge state on the 'control' qubit has a state-dependent difference in electric field on a second 'target' qubit. If configured correctly, this electric field can manipulate detuning of the 'target' qubit to either process faster along the z-axis or change its gate type from Pauli-z to a Pauli-x gate. The advantage of the electric-dipole induced two-qubit gate is that the individual double dots forming the singlet-triplet qubits may be spaced far apart (more than an order of magnitude further than the individual dot-to-dot separation distance within a single singlet-triplet qubit). Thus, the method is conducive for a scalable architecture as the routing of control lines is less difficult since the qubits are not so tightly packed.

In certain embodiments, the 2D array shown in FIG. 4 can be used to perform a CZ or CX gate. A CZ gate performs a Pauli-z rotation (by angle $\pi$) on a target qubit conditional on the state of a control qubit. The two qubits, control and target, are initially biased such that the exchange coefficient (J) is much greater than the magnetic field gradient ($\alpha E_z$); that is, performing a Pauli-z gate at the same frequency.

When biasing the control qubit towards positive detuning, the control qubit remains in the (1, 1) charge state if in the triplet ($T_0$) state due to Pauli-spin blockade. However, if the control qubit is in the singlet S(1,1) state, it may enter the (0, 2) charge state via S(0,2). On the target qubit, there is no change if the control qubit is in the triplet $T_0$ state. However, if the control qubit is in the singlet $s_{02}$ state, the target qubit's detuning shifts to a point of higher J and thus, a faster z-axis precession frequency. Thus for example, if one tunes this shift in J to double the precession frequency, then on waiting for a $\pi$ z-axis rotation (with the control qubit in the $T_0$ state) would become an identity operation with the control qubit in the $s_{02}$ state as the rotation angle will be $2\pi$. The resulting gate operation is a CZ gate where the target qubit undergoes a $\pi$ rotation about the Pauli-z axis conditional on the control qubit being in the triplet $T_0$ state.

Figure 10:
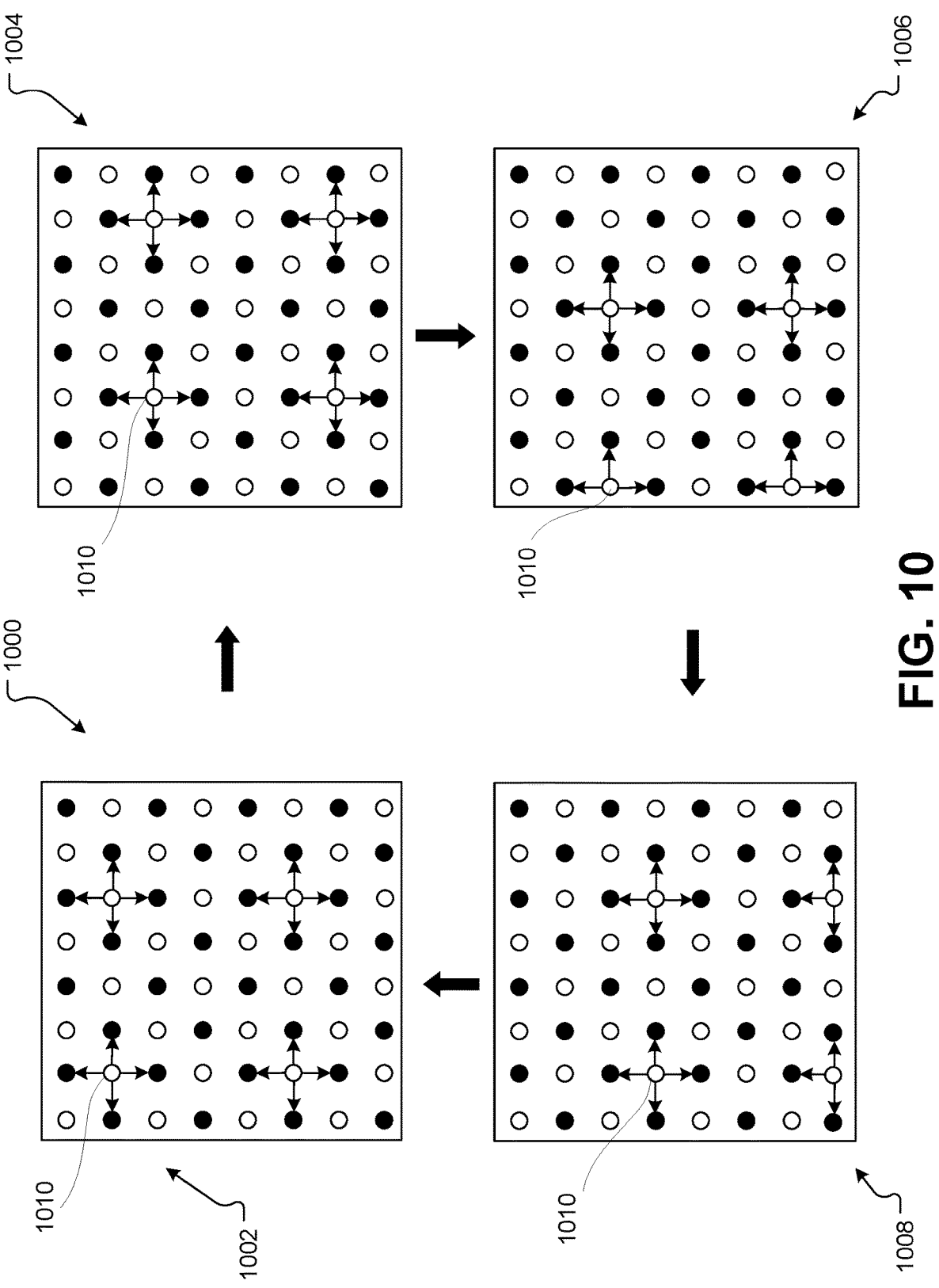
FIG. 10 illustrates an example cycle of surface code performed by the 2D array of FIG. 4.

FIG. 10 illustrates a quantum gate diagram 1000 showing the steps performed to perform four CCCCZ gates (controlled-controlled-controlled-controlled-Z gates) between a control qubit and target qubits. In this example, the white qubits are data qubits whereas the black qubits are ancilla qubits. In particular, FIG. 10 illustrates four cycles 1002 to 1008 of CZ operations to perform one cycle of the surface code. In each cycle, a given data qubit, e.g., qubit 1010, performs a CZ gate on four adjacent ancilla target qubits (along the left, right, top and bottom directions). For instance, in each cycle, a given control qubit 1010 performs a CZ gate as described above on all four nearest-neighbour target qubits—two on the same layer, one on the layer above and one of the layer below.

To perform CX gates, Hadamard operations are appended to the target qubits on either side of a CZ gate.

The term "comprising" (and its grammatical variations) as used herein are used in the inclusive sense of "having" or "including" and not in the sense of "consisting only of".

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A one-dimensional array of qubits comprising:

two or more double-quantum dots embedded in silicon, the two or more double-quantum dots arranged in two parallel arrays which are offset with respect to each other (Echelon formation), such that inter qubit coupling between the two or more double-quantum dots is approximately 5 GHz to 50 GHz;

two or more reservoirs to load electrons to the two or more double-quantum dots to form singlet-triplet qubits in each double-quantum dot; and two or more gates for controlling the formed singlet-triplet qubits.

2. The one-dimensional array of claim 1, wherein the double-quantum dots are formed using phosphorus donor atoms patterned into a silicon substrate.

3. The one-dimensional array of claim 1, wherein the inter qubit coupling between the two or more double-quantum dots is approximately 30 GHz±20 GHz.

4. The one-dimensional array of claim 1, wherein an inter-dot tunnel coupling value between two quantum dots in each double-quantum dot is approximately 10.5 GHz±9.5 GHz.

5. The one-dimensional array of claim 1, wherein distance between the double-quantum dots and the two or more gates is approximately 45 nm±5 nm.

6. The one-dimensional array of claim 1, wherein distance between the double-quantum dots and the two or more reservoirs is approximately 17 nm±1 nm.

7. The one-dimensional array of claim 1, wherein each double quantum dot includes a 1P donor and a 2P donor in an asymmetric configuration and the two or more double-quantum dots are arranged parallel to an adjacent pair of qubits.

8. The one-dimensional array of claim 1, wherein an angle between two dots in each double-quantum dot is approximately 32±3 degrees.

9. The one-dimensional array of claim 7, wherein the 1P donor in each double quantum dot is positioned closer to a corresponding reservoir and the 2P donor in each double quantum dot is positioned away from the corresponding reservoir.

10. A two-dimensional quantum information processor, comprising two or more layers of vertically stacked one-dimensional arrays of double-quantum dots, each one-dimensional layer being fabricated of silicon, each array further comprising:

two or more reservoirs to load electrons to the double-quantum dots to form singlet-triplet qubits in each double-quantum dot; and two or more gates for controlling the formed singlet-triplet qubits.

11. A two-dimensional quantum information processor comprising two or more layers of vertically stacked one-dimensional arrays of double-quantum-dots, each of the two or more layers of vertically stacked one-dimensional arrays of qubits comprising:

two or more double-quantum dots embedded in silicon, the two or more double-quantum dots arranged in two parallel arrays which are offset with respect to each other (Echelon formation), such that inter qubit coupling between the two or more double-quantum dots is approximately 5 GHz to 50 GHz;

two or more reservoirs to load electrons to the corresponding two or more double-quantum dots to form singlet-triplet qubits in each double-quantum dot; and two or more gates for controlling the formed singlet-triplet qubits.

12. The two-dimensional quantum information processor of claim 10, wherein adjacent layers of the two or more layers are at a distance of approximately 35 nm±3 nm from each other.

13. The two-dimensional quantum information processor of claim 10, wherein adjacent layers of the two or more layers are horizontally offset from each other by approximately 5 nm±3 nm.

14. The two-dimensional quantum information processor of claim 10, wherein positions of the two or more reservoirs and the two or more gates are swapped on alternating layers.

15. The two-dimensional quantum information processor of claim 11, wherein adjacent layers of the two or more layers are at a distance of approximately 35 nm±3 nm from each other.

16. The two-dimensional quantum information processor of claim 11, wherein adjacent layers of the two or more layers are horizontally offset from each other by approximately 5 nm±3 nm.

17. The two-dimensional quantum information processor of claim 11, wherein positions of the two or more reservoirs and the two or more gates are swapped on alternating layers.

18. The one-dimensional array of claim 1, wherein the inter qubit coupling between the two or more double-quantum dots is approximately 39 GHz±4 GHz and an inter-dot tunnel coupling value between two quantum dots in each double-quantum dot is approximately 6.5 GHz±1 GHz.

19. The one-dimensional array of claim 1, wherein a distance between the two or more double-quantum dots is approximately 50 nm±20 nm.

20. The one-dimensional array of claim 1, wherein a distance between two quantum dots in each double-quantum dot is approximately 11.5 nm±3.5 nm.

* * * * *